(12) United States Patent
Nugent

(10) Patent No.: US 10,891,045 B2
(45) Date of Patent: *Jan. 12, 2021

(54) APPLICATION INSPECTOR

(71) Applicant: eBay Inc., San Jose, CA (US)

(72) Inventor: Tyler Yong Nugent, Portland, OR (US)

(73) Assignee: eBay Inc., San Jose, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/051,086

(22) Filed: Jul. 31, 2018

(65) Prior Publication Data

US 2018/0335924 A1 Nov. 22, 2018

Related U.S. Application Data

(63) Continuation of application No. 15/070,323, filed on Mar. 15, 2016, now Pat. No. 10,089,002.

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0412* (2013.01); *G06F 3/04842* (2013.01); *G06F 3/04847* (2013.01); *G06T 11/00* (2013.01); *G06T 11/001* (2013.01); *G06T 11/60* (2013.01); *G06F 2203/04104* (2013.01)

(58) Field of Classification Search
CPC ...... G06F 3/048; G06F 3/0488; G06F 3/0412; G06F 3/04847; G06F 3/04842; G06F 2203/04104; G06T 11/00; G06T 11/60; G06T 11/001
See application file for complete search history.

(56) References Cited

U.S. PATENT DOCUMENTS 5,917,492 A * 6/1999 Bereiter ................ G06F 3/0489
715/799
9,104,799 B2 8/2015 Martineau et al.
(Continued)

OTHER PUBLICATIONS

"UI Browser", Retrieved from the Internet: <URL: http://pfiddlesoft.com/uibrowser/>, Jun. 13, 2016, 3 pages.
(Continued)

*Primary Examiner* — Pei Yong Weng
(74) *Attorney, Agent, or Firm* — SBMC

(57) ABSTRACT

An application is installed on a device that includes a user interface comprising multiple elements organized in a hierarchy. The application communicates with an inspector tool that accesses the hierarchy. The inspector tool may be integrated into the application or separate from the application. During execution of the application, the inspector identifies an element in the hierarchy and presents information regarding the element. For example, a display region corresponding to the element may be highlighted or text regarding the element may be displayed. The hierarchy may be navigated by selection of items in the user interface itself, by selection of an item in the displayed information, by directional inputs, or any suitable combination thereof. Information displayed in the inspector may be configured by the application based on the identified element.

20 Claims, 12 Drawing Sheets

(51) Int. Cl.
*G06T 11/60* (2006.01)
*G06T 11/00* (2006.01)
*G06F 3/041* (2006.01)
*G06F 3/0484* (2013.01)

(56) References Cited

U.S. PATENT DOCUMENTS

| | | |
|---|---|---|
| 10,089,002 B2 | 10/2018 | Nugent |
| 2005/0268234 A1* | 12/2005 | Rossi, Jr. ................ G06F 9/453 715/705 |
| 2005/0278585 A1* | 12/2005 | Spencer .............. G06F 11/3664 714/46 |
| 2007/0260929 A1* | 11/2007 | Liu ..................... G06F 11/3644 714/38.14 |
| 2017/0269807 A1 | 9/2017 | Nugent |

OTHER PUBLICATIONS

Applicant-Initiated Interview Summary received for U.S. Appl. No. 15/070,323, dated Mar. 8, 2018, 3 pages.
Non-Final Office Action received for U.S. Appl. No. 15/070,323, dated Jan. 12, 2018, 9 pages.
Notice of Allowance received for U.S. Appl. No. 15/070,323, dated May 31, 2018, 7 pages.
Response to Non-Final Office Action filed on Apr. 11, 2018, for U.S. Appl. No. 15/070,323, dated Jan. 12, 2018, 24 pages.
Ryan, "Introducing FLEX—Flipboard Engineering", Retrieved from the Internet: <URL: http://engineering.flipboard.com/2014/07/flex/>, Jul. 24, 2014, 2 pages.

* cited by examiner

APPLICATION INSPECTOR

RELATED APPLICATIONS

This application is a continuation of and claims priority to U.S. patent application Ser. No. 15/070,323, filed Mar. 15, 2016, entitled "Application Inspector", the entire disclosure of which is hereby incorporated by reference herein in its entirety.

BACKGROUND

A software application has a user interface. Various elements of the user interface are nested within other elements of the user interface.

BRIEF DESCRIPTION OF THE DRAWINGS

Some embodiments are illustrated, by way of example and not limitation, in the figures of the accompanying drawings.

DETAILED DESCRIPTION

Example methods and systems are directed to inspecting applications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, an application is installed on a device. The application includes a user interface comprising multiple elements organized in a hierarchy. The application communicates with an inspector tool that accesses the hierarchy. The inspector tool may be integrated into the application (e.g., compiled into an executable file including both the application and the inspector tool) or separate from the application (e.g., running in a separate process and communicating with the application via inter-process communications).

During execution of the application, the inspector identifies an element in the hierarchy and presents information regarding the element. For example, a display region corresponding to the element may be highlighted or text regarding the element may be displayed. In some example embodiments, the text identifies one or more of: a class of the element, a location of the element on the display, a size of the element on the display, a memory consumption of the element, the relation of the element to other elements in the hierarchy (e.g., siblings, parents, or children), and a memory location of the element. The application code can extend the capabilities of the inspector to display customizable contextual information about the focused element (e.g., a photo album application might want to debug photo views by displaying their image size on disk and file system path).

Additionally or alternatively, the inspector superimposes a transparent layer over the application. The transparent layer includes outlines over the view elements of the user interface of the application, allowing the user to see the location and size of the various views in the user interface.

Software Architecture

Figure 1:
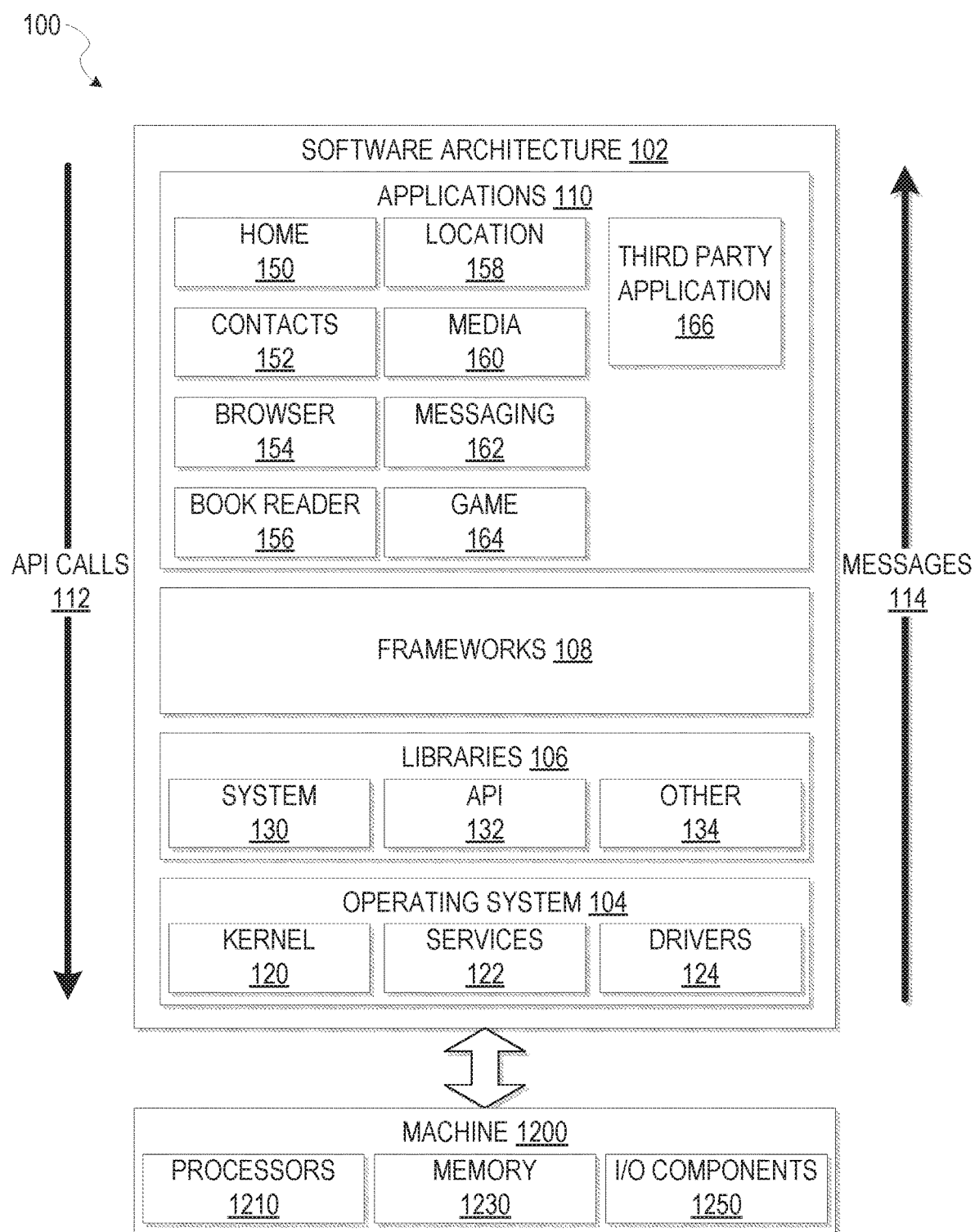
FIG. 1 is a block diagram illustrating an example of a software architecture that may be installed on a machine, according to some example embodiments.

FIG. 1 is a block diagram 100 illustrating a software architecture 102, which may be installed on a device running the application being inspected. FIG. 1 is merely a non-limiting example of a software architecture, and it will be appreciated that many other architectures may be implemented to facilitate the functionality described herein. The software architecture 102 may be implemented by hardware such as machine 1200 of FIG. 12 that includes processors 1210, memory 1230, and input/output (I/O) components 1250. In this example architecture, the software architecture 102 may be conceptualized as a stack of layers where each layer may provide a particular functionality. For example, the software architecture 102 includes layers such as an operating system 104, libraries 106, frameworks 108, and applications 110. Operationally, the applications 110 invoke application programming interface (API) calls 112 through the software stack and receive messages 114 in response to the API calls 112, according to some implementations.

In various implementations, the operating system 104 manages hardware resources and provides common services. The operating system 104 includes, for example, a kernel 120, services 122, and drivers 124. The kernel 120 acts as an abstraction layer between the hardware and the other software layers in some implementations. For example, the kernel 120 provides memory management, processor management (e.g., scheduling), component management, networking, security settings, among other functionality. The services 122 may provide other common services for the other software layers. The drivers 124 may be responsible for controlling or interfacing with the underlying hardware. For instance, the drivers 124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 106 provide a low-level common infrastructure that may be utilized by the applications 110. The libraries 106 may include system libraries 130 (e.g., C standard library) that may provide functions such as memory allocation functions, string manipulation functions, mathematic functions, and the like. In addition, the libraries 106 may include API libraries 132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 106 may also include a wide variety of other libraries 134 to provide many other APIs to the applications 110.

The frameworks 108 provide a high-level common infrastructure that may be utilized by the applications 110, according to some implementations. For example, the frameworks 108 provide various graphic user interface (GUI) functions, high-level resource management, high-level location services, and so forth. The frameworks 108 may provide a broad spectrum of other APIs that may be utilized by the applications 110, some of which may be specific to a particular operating system or platform.

In an example embodiment, the applications 110 include a home application 150, a contacts application 152, a browser application 154, a book reader application 156, a location application 158, a media application 160, a messaging application 162, a game application 164, and a broad assortment of other applications such as a third party application 166. According to some embodiments, the applications 110 are programs that execute functions defined in the programs. Various programming languages may be employed to create one or more of the applications 110, structured in a variety of manners, such as object-orientated programming languages (e.g., Objective-C, Java, or C++) or procedural programming languages (e.g., C or assembly language). In a specific example, the third party application 166 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third party application 166 may invoke the API calls 112 provided by the mobile operating system 104 to facilitate functionality described herein.

Figure 2:
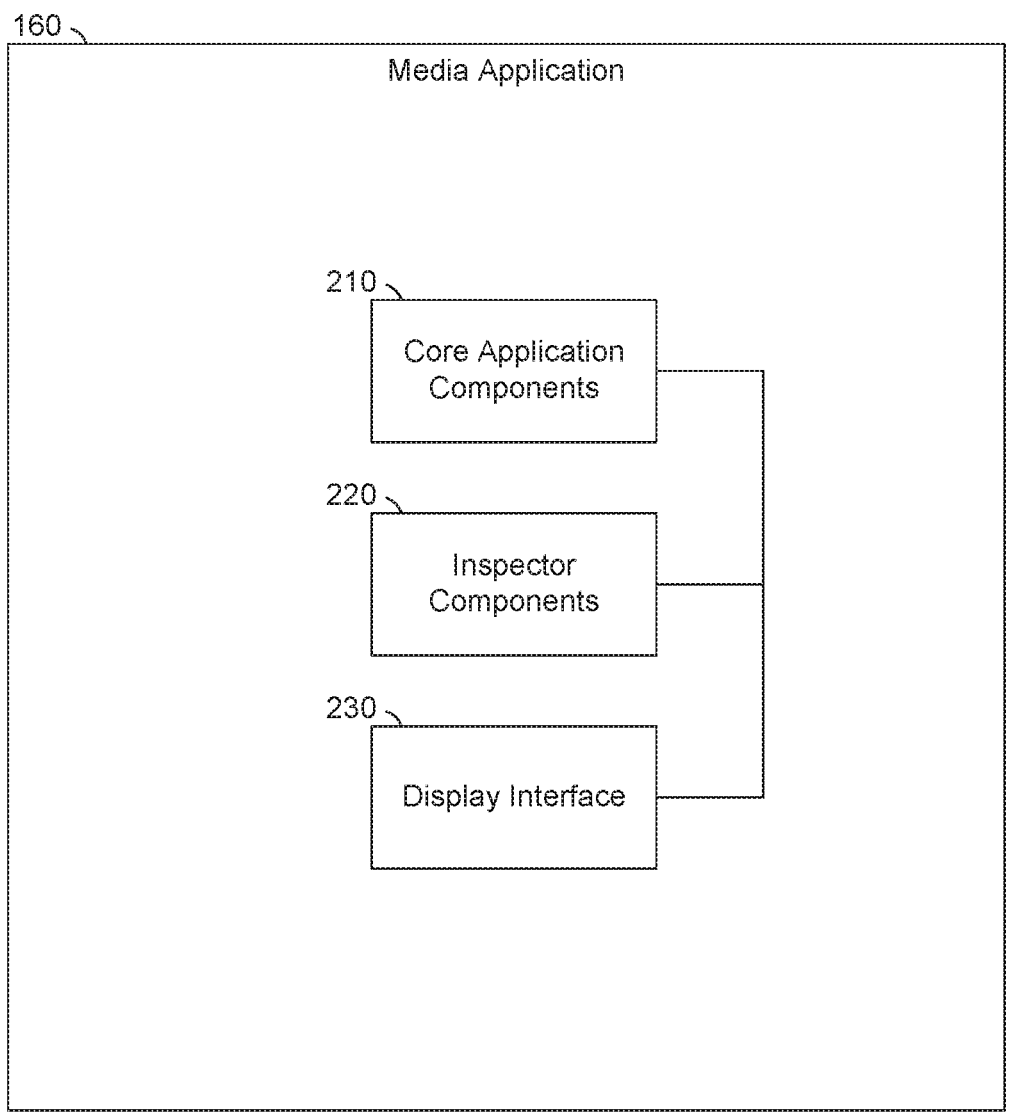
FIG. 2 is a block diagram illustrating components of a media application integrated with an inspector, according to some example embodiments.

FIG. 2 is a block diagram illustrating components of an example application, such as the media application 160, according to some example embodiments. The media application 160 is shown as including core application components 210, inspector components 220, and a display interface 230 all configured to communicate with each other (e.g., via a bus, shared memory, or a switch). Any one or more of the components described herein may be implemented using hardware (e.g., a processor of a machine). Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

The core application components 210 are configured to perform the operations of an application (e.g., the media application 160). For example, the media application 160 may have a user interface including menus and buttons to receive user input, audio and visual output of media played for the user, network communication components to send and receive media and commands over a network, storage components to store data locally or remotely, and so on. The core application components 210 use the display interface 230 to display the user interface of the application to the user.

The inspector components 220 are configured to perform the operations of the application inspector. By communicating with the core application components 210, the inspector components 220 gather information regarding the user interface of the media application 160. By communicating with the display interface 230, the inspector components 220 present some or all of the gathered information to the user.

Figure 12:
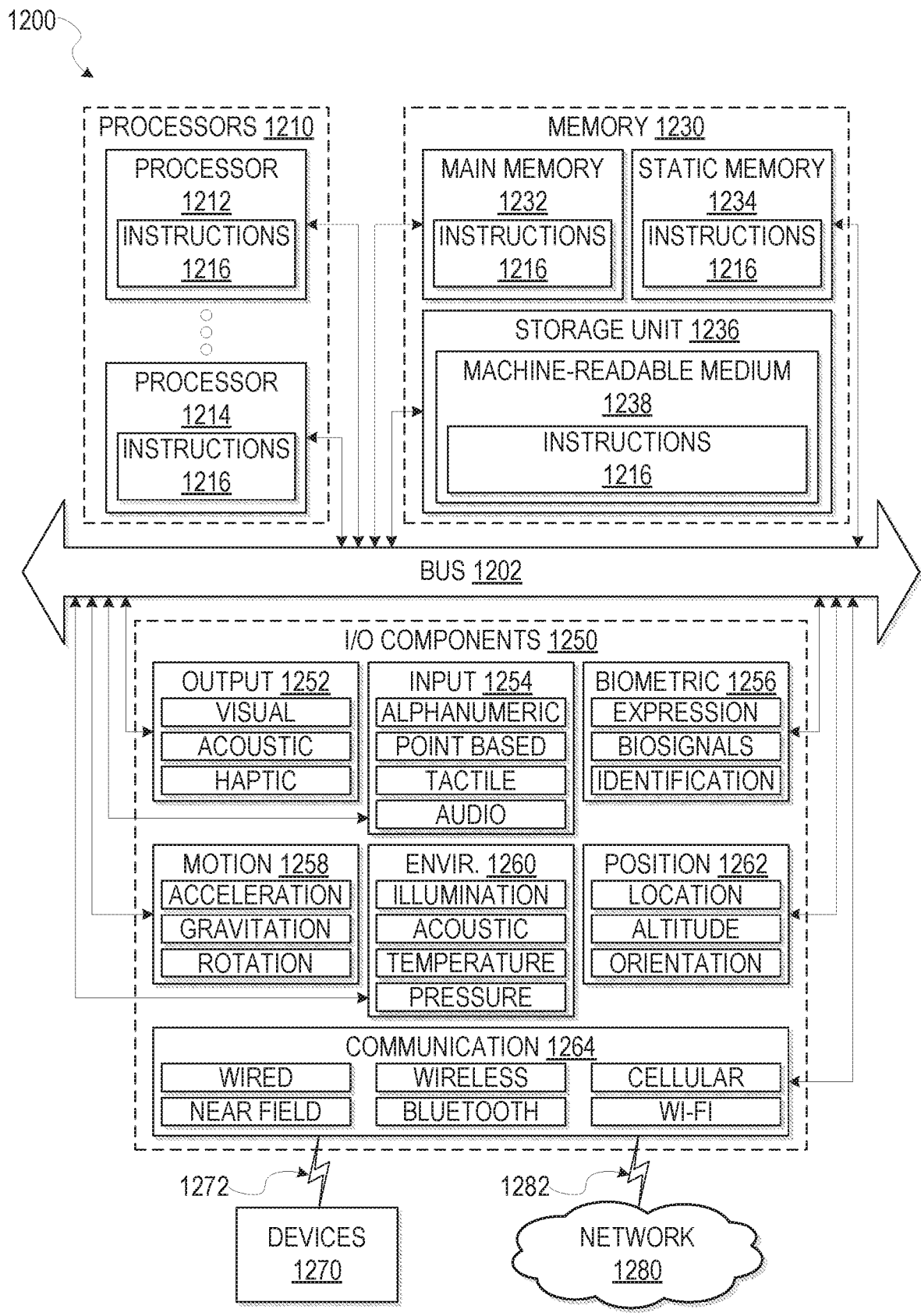
FIG. 12 illustrates a diagrammatic representation of a machine in the form of a computer system within which a set of instructions may be executed for causing the machine to perform any one or more of the methodologies discussed herein, according to an example embodiment.

The display interface 230 causes the display of the user interface of the application and the inspector on a display device of the machine (e.g., the machine 1200 of FIG. 12). For example, the display interface 230 may interact with drivers 124 to control a display device.

Figure 3:
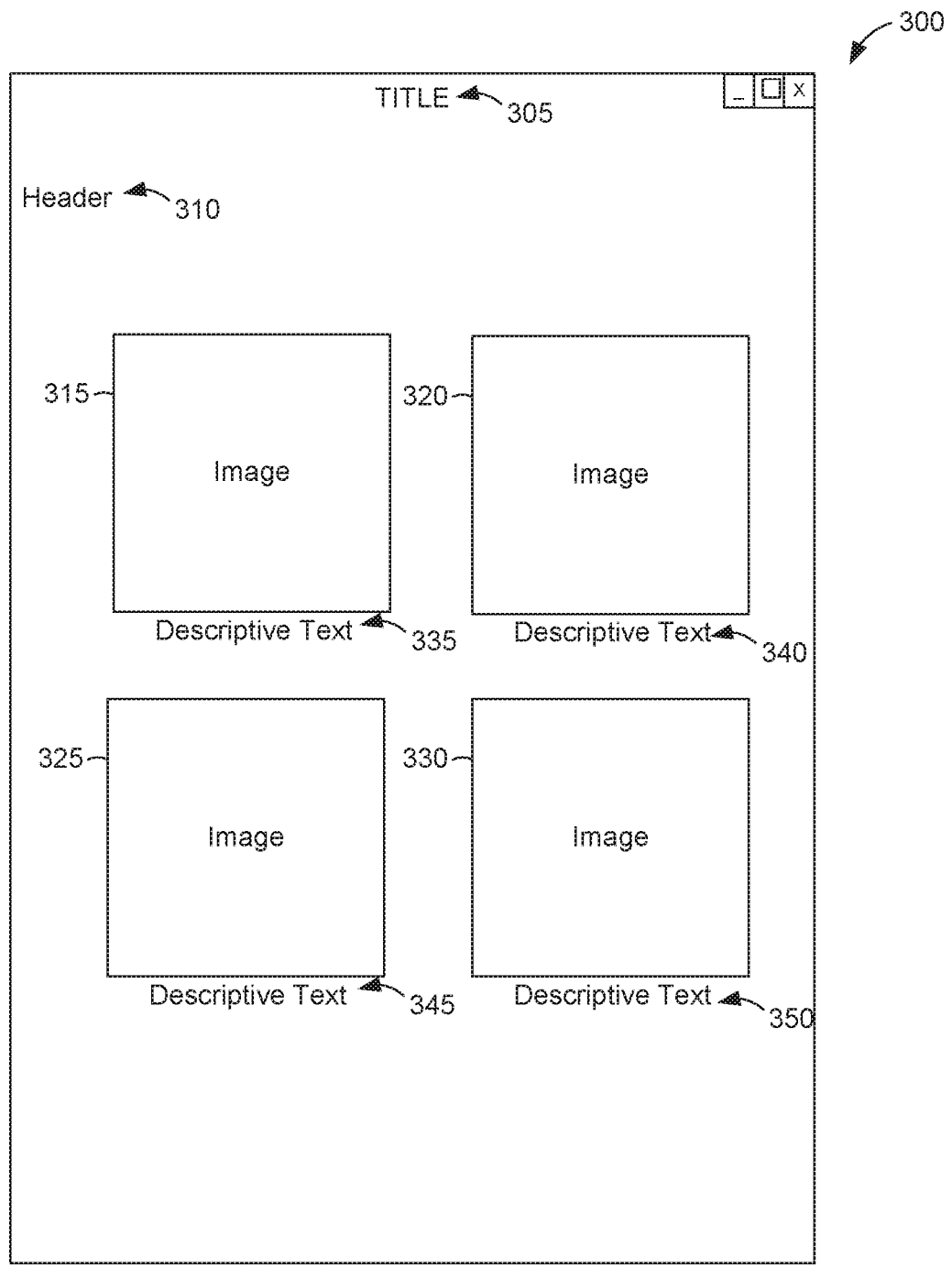
FIG. 3 is a block diagram illustrating an example user interface, according to some example embodiments.

FIG. 3 is a block diagram 300 illustrating an example user interface, according to some example embodiments. The block diagram 300 includes a title 305, a header 310, images 315-330, and descriptive text 335-350. In the example embodiment of a media application 160, the images 315-330 are still images from corresponding videos and the descriptive text 335-350 describe the corresponding videos. In another example embodiment of a shopping application, the images 315-330 depict items for sale and the descriptive text 335-350 describe the items.

Figure 4:
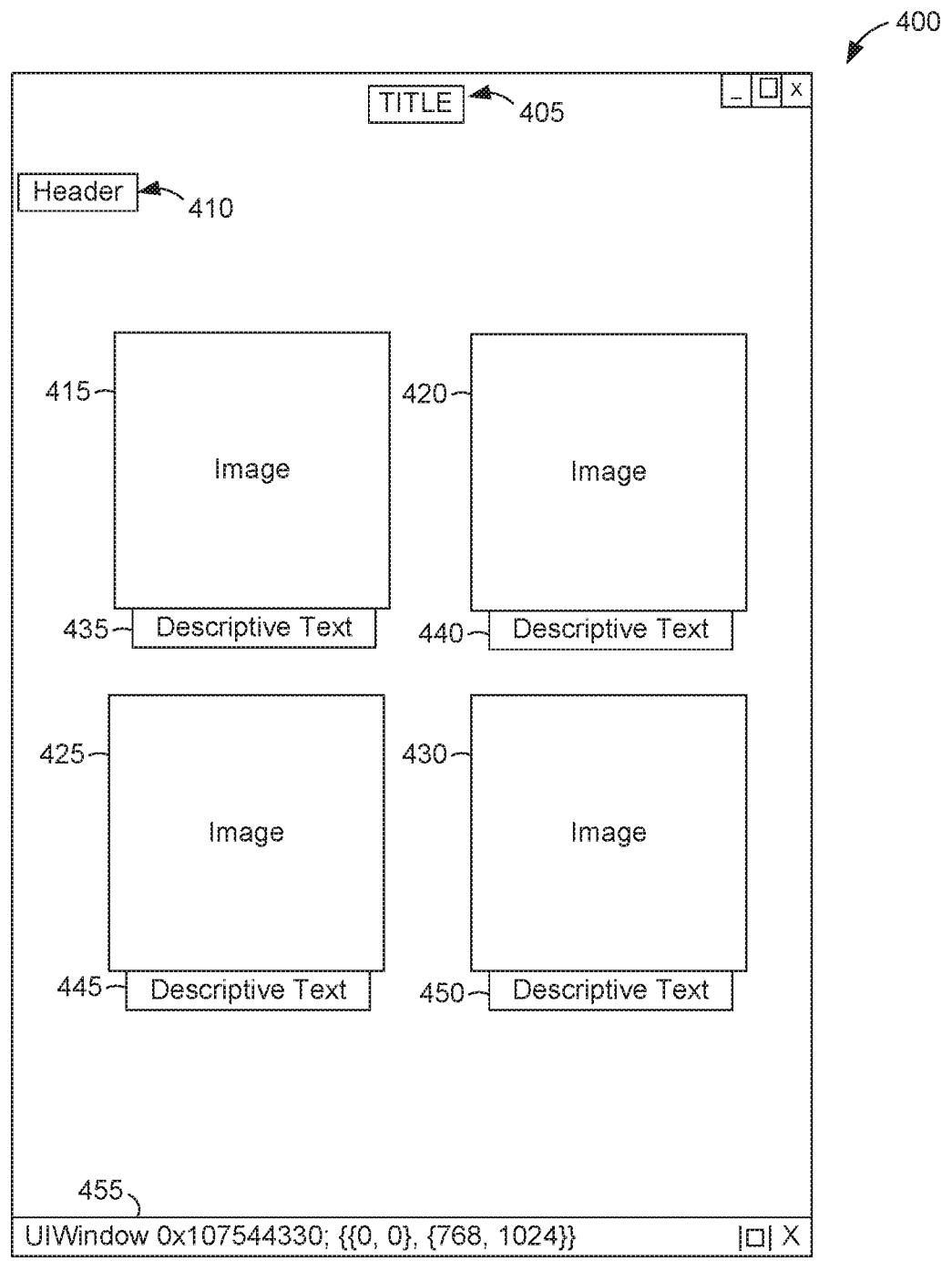
FIG. 4 is a block diagram illustrating a user interface suitable for presenting inspector data, according to some example embodiments.

FIG. 4 is a block diagram 400 illustrating a user interface suitable for presenting inspector data, according to some example embodiments. The user interface 400 of FIG. 4 may be presented in response to receiving a command from a user of the application illustrated in FIG. 3. Accordingly, elements 405-450 correspond to elements 305-350. As can be seen in FIG. 4, each of elements 405, 410, and 435-450 include an outline not present around the corresponding element of FIG. 3. In some example embodiments, outlines around existing elements (e.g., elements 415-430) change color or become thicker. Additionally or alternatively, the outlines may be color-coded. For example, the inspector components 220 may be configured to recognize particular classes of user interface elements and to use particular colors for particular classes or groups of classes. Thus, in an example embodiment, UIView objects are outlined in green, UIWindow objects are outlined in blue, and UILayoutContainerView objects are outlined in red while objects of other classes are outlined in black. Similarly, classes or groups of classes that implement particular interfaces can be color-coded. Thus, in an example embodiment, all classes that inherit from or implement a customized user interface theming class/interface are displayed in one color while all other classes are displayed in a different color. In some example embodiments, the inspector makes a request to the application to determine if a particular color should be used for a particular view. If no particular color is indicated by the application, the inspector uses a default color. Thus, the application can use any logic it wants to determine and classify the element with a color of its choosing (e.g., to have all elements that are bigger than x, y be outlined in yellow.)

In some example embodiments, color-coding is used to indicate compliance by the view objects with one or more rules. For example, the inspector components 220 may test to see if the frame of every child object is entirely contained within the frame of its parent. When the child object complies with this rule, a black border is used; when the child object does not comply with this rule, a red border is used.

The outlines around all elements are visible, in some example embodiments. In other example embodiments, when two elements overlap, the z-ordering of the elements is determined and the outline around the element closest to the viewer is shown while the outline around the more distant element is wholly or partially occluded by the closer element. For example, in FIG. 4, if the element 415 is positioned closer to the user than the element 435, and the top of the element 435 overlaps with the element 415, then the top of the outline for the element 435 is occluded by the outline for the element 415. A user interface element (e.g., a button) may be presented to allow the user to toggle between displaying all outlines and applying z-ordering occlusion.

In some example embodiments, the command received from the user to cause the display of the user interface of FIG. 4 is a two-finger touch gesture on a touch screen. In other example embodiments, the user interface of FIG. 4 is displayed in response to a voice command, a keyboard command, or an inter-process communication. In an example embodiment, the core application components 210 are in communication with a server application and the user interface of FIG. 4 is displayed in response to a command received from the server application.

In addition to elements corresponding to those of FIG. 3, FIG. 4 also includes information bar 455. As shown in FIG. 4, information bar 455 comprises three sections. The first section shows the name of a class of the top-level user interface element, "UIWindow," a memory location of the element, an (x,y) position of the element, and a (width, height) size of the element. The second section is a focus-lock button, operable to cause the currently-selected element to be treated as the top-level element for the view hierarchy. The third section is operable to close the information bar and restore the screen of FIG. 3. In various example embodiments, more or fewer sections of the information bar 455 are shown.

Figure 5:
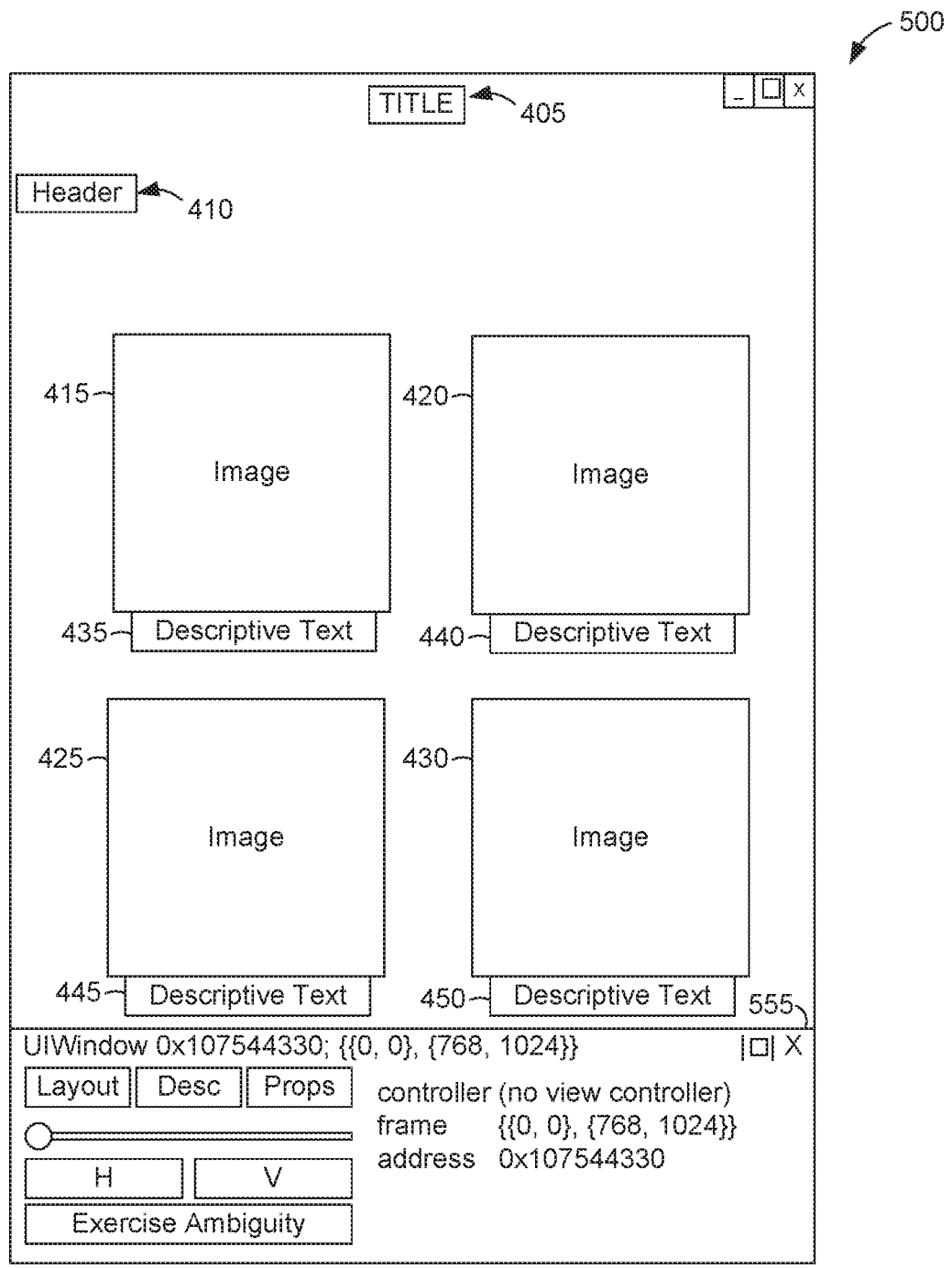
FIG. 5 is a block diagram illustrating a user interface suitable for presenting inspector data, according to some example embodiments.

FIG. 5 is a block diagram 500 illustrating a user interface suitable for presenting inspector data, according to some example embodiments. The user interface of FIG. 5 may be displayed after receiving a user command to expand the information bar 455 of FIG. 4. For example, the user may tap on the information bar 455, click on the information bar with a mouse, or use a keyboard command. In some example embodiments, the user interface of FIG. 5 is presented upon receipt of a user command while the user is viewing the user interface of FIG. 3, without passing through the user interface of FIG. 4 as an intermediary step. As can be seen by comparison of FIGS. 4 and 5, the information bar 455 has been replaced with information region 555, described in more detail with respect to FIG. 6 below.

Figure 6:
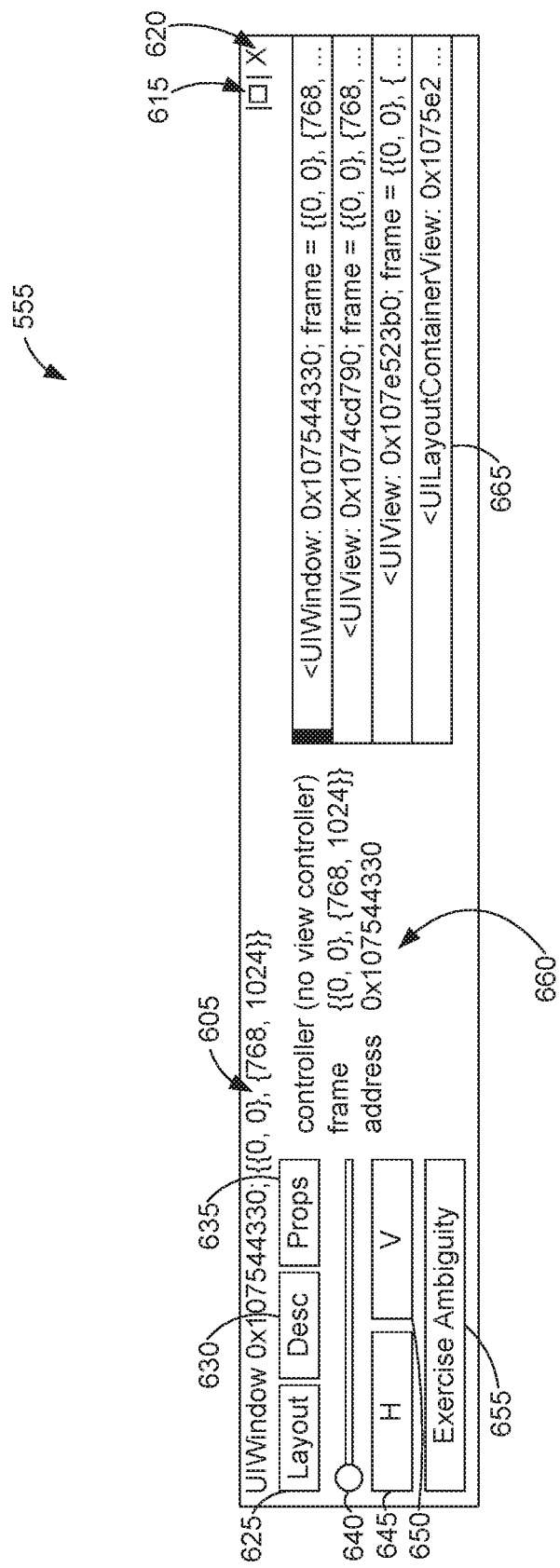
FIG. 6 is a block diagram illustrating a user interface suitable for presenting inspector data, according to some example embodiments.

FIG. 6 is a block diagram illustrating information region 555, suitable for presenting inspector data, according to some example embodiments. Information region 555 includes summary information 605, a highlight button 615, a close button 620, a layout button 625, a description button 630, a properties button 635, an opacity slider 640, a horizontal button 645, a vertical button 650, an ambiguity button 655, descriptive information 660, and hierarchy information 665.

The summary information 605, highlight button 615, and close button 620 correspond to the four sections of the information bar 455 described above with respect to FIG. 4.

The opacity slider 640 is operable to change the opacity of the overlay layer showing the boundaries of the user interface elements. For example, with the opacity slider 640 all the way to the left, as shown in FIG. 6, the overlay layer may be completely transparent so that the only change to the user interface of FIG. 3 is the appearance of the bounding boxes around the interface elements and the presentation of the information region 555. With the opacity slider 640 all the way to the right, the overlay layer may be completely opaque, so that only the bounding boxes can be seen. In some example embodiments, the maximum opacity is less than 100%, so that even when the slider is at the extreme right, the user interface of the application is still at least partially visible. Additionally or alternatively, the opacity slider 640 may control the degree of occlusion of overlapping elements. For example, with the opacity slider 640 all the way to the left, outlines for all elements are shown regardless of overlap, and with the opacity slider 640 all the way to the right, outlines for elements that are overlapped by other elements having higher z-layers are hidden where the overlap occurs. Continuing with this example, when the opacity slider 640 is between the two extremes, the overlapped portions of the outlines are shown with proportional intensity, based on the position of the opacity slider 640. The opacity slider 640 may be described as an x-ray tool that lets the user peek through stack views that are obscuring views below.

The layout button 625, the description button 630, the properties button 635, the horizontal button 645, the vertical button 650, and the ambiguity button 655 are operable to perform actions for debugging the layout of the user interface. For example, the horizontal button 645 sends all horizontal constraints relevant to the view in focus to a console (e.g., a streaming text output on a connected developer machine). The vertical button 650 may operate similarly with respect to vertical constraints. As another example, the exercise ambiguity button 655 may send a message to the view to tell the layout system of the application to re-layout to see if anything changes visually. Other buttons are operable to perform other functions, which may be defined by the inspector or the application. For example, directional buttons may be added that are operable to cause the location and size of a view to be dynamically adjusted.

The descriptive information 660 displays information regarding a currently-selected element. The currently-selected element may be selected by default (e.g., the top-level element may be automatically selected when the user chooses to activate the inspector, causing the screen of FIG. 4 or FIG. 5 to be initially presented), by the user (e.g., by tapping or clicking on a particular element in the screen, tapping or clicking on a particular entry in the hierarchy information 665, or using a directional input to navigate to a parent, child, or sibling element), or by the application (e.g., automatically selecting a particular element based on an error, warning, or debug condition). As shown in FIG. 6, the descriptive information 660 includes an indication that the element does not have a view controller, coordinates of the location and size of the frame of the element, and a memory address of the element. The information displayed may be extended by the application to display arbitrary information about the view. The application can also provide a color so that the text in the row can be colored to match the color used to paint an outline. For example, cyan may be used to outline labels using a particular styling system, and using cyan to display the styling information in the information area for the view may make it easier for a user to make the association.

Some or all of the information in the descriptive information 660 may be gathered by calling functions on the user interface object. For example, reflection may be used to get the class name of the object, a getFrame( ) function may be used to get a frame object from which the coordinates of the element can be requested, and so on.

The hierarchy information 665 shows a portion of the user interface hierarchy of the application. In FIG. 6, information regarding the top-level element of the user interface is shown in the summary information 605 and the descriptive information 660. The corresponding element in the hierarchy information 665 is marked with a darkened rectangle. The nature of the hierarchy is shown by indentations, such that child elements are indented farther than their parents and elements at the same level of the hierarchy have the same indentation. The hierarchy information 665 is operable to scroll up and down through the hierarchy. The hierarchy information 665 is also operable to select a different element to have information displayed in the summary information 605 and the descriptive information 660. When the focus-lock button is engaged, the hierarchy element is trimmed down to display only views under the focus-lock element. Use of the focus-lock feature may aid a developer in isolating portions of the view hierarchy of interest.

Figure 7:
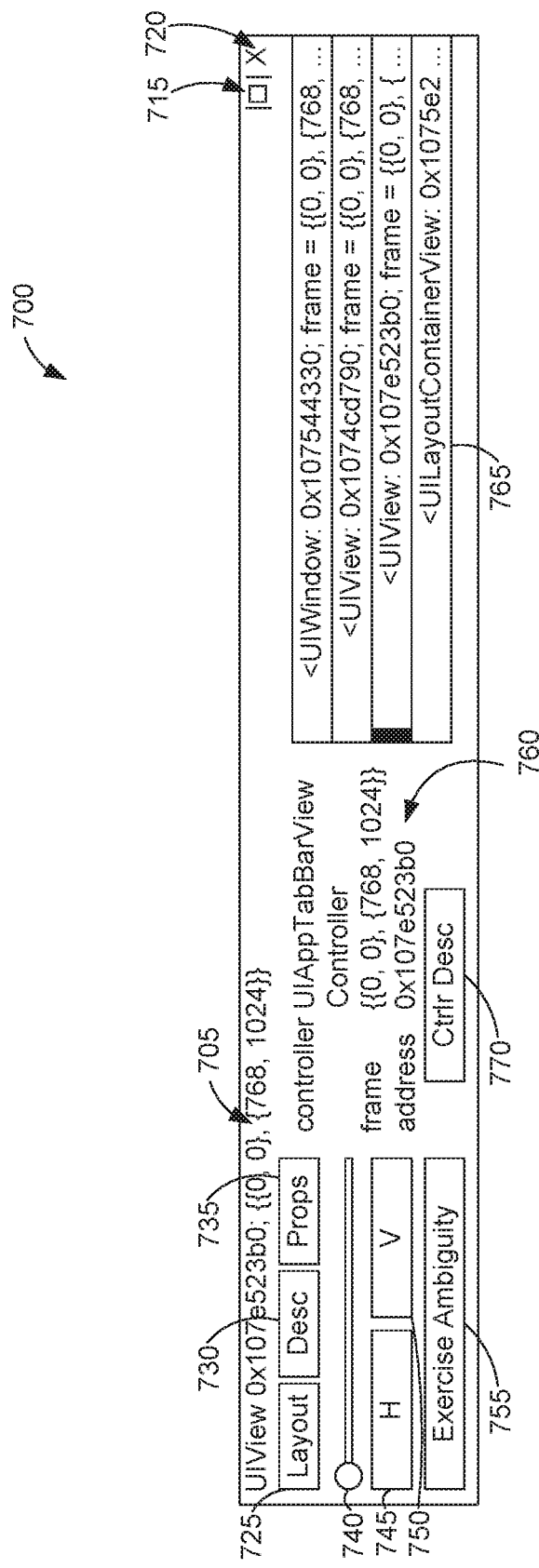
FIG. 7 is a block diagram illustrating a user interface suitable for presenting inspector data, according to some example embodiments.

FIG. 7 is a block diagram illustrating information region 700, suitable for presenting inspector data, according to some example embodiments. Information region 700 may be shown in place of information region 555 after a different user interface element is selected. Information region 700 includes summary information 705, a focus-lock button 715, a close button 720, a layout button 725, a description button 730, a properties button 735, an opacity slider 740, a horizontal button 745, a vertical button 750, an ambiguity button 755, descriptive information 760, hierarchy information 765, and controller specific button 770. The elements 715-745 of FIG. 7 correspond to the elements 615-645 of FIG. 6.

The summary information 705 shows information related to the selected user interface element: a class, a memory location, and coordinates of the corners of the frame and its dimensions. The descriptive information 760 shows that the controller of the selected user interface element is UIAppTabBarViewController, that the coordinates of the corners of the frame of the element are (0,0) and (768,1024), and that the memory address of the element is 0x107e523b0. Additionally, controller specific button 770 is presented. The controller specific button 770 is operable to execute a function provided by the particular controller. For example, the inspector components 220 may be written in an object-oriented language with exposed extension points. Using these exposed extension points, an implementer of the inspector components 220 can extend the inspector tool to recognize particular controller classes and, via the controller specific button 770, allow a user to invoke particular methods of the controller. In this way, run-time debugging of particular features can be enabled without requiring modification of the debugged classes themselves. Accordingly, the chance of inadvertently introducing new problems when removing or disabling the debug code is reduced.

The hierarchy information 765 indicates the currently-selected element, which is lower in the hierarchy than the element selected in the hierarchy information 665 of FIG. 6. Nonetheless, in some example embodiments (including the one shown in FIG. 7), unless focus-lock is set, the entire hierarchy is shown. The user may use the focus-lock button 715 to cause the hierarchy information 765 to be modified to the currently-selected element as the root of the hierarchy, so that only the currently-selected element and its descendants are shown. Additionally, in some example embodiments, selecting an item in the application will cause the hierarchy information 765 to scroll to the item.

Figure 8:
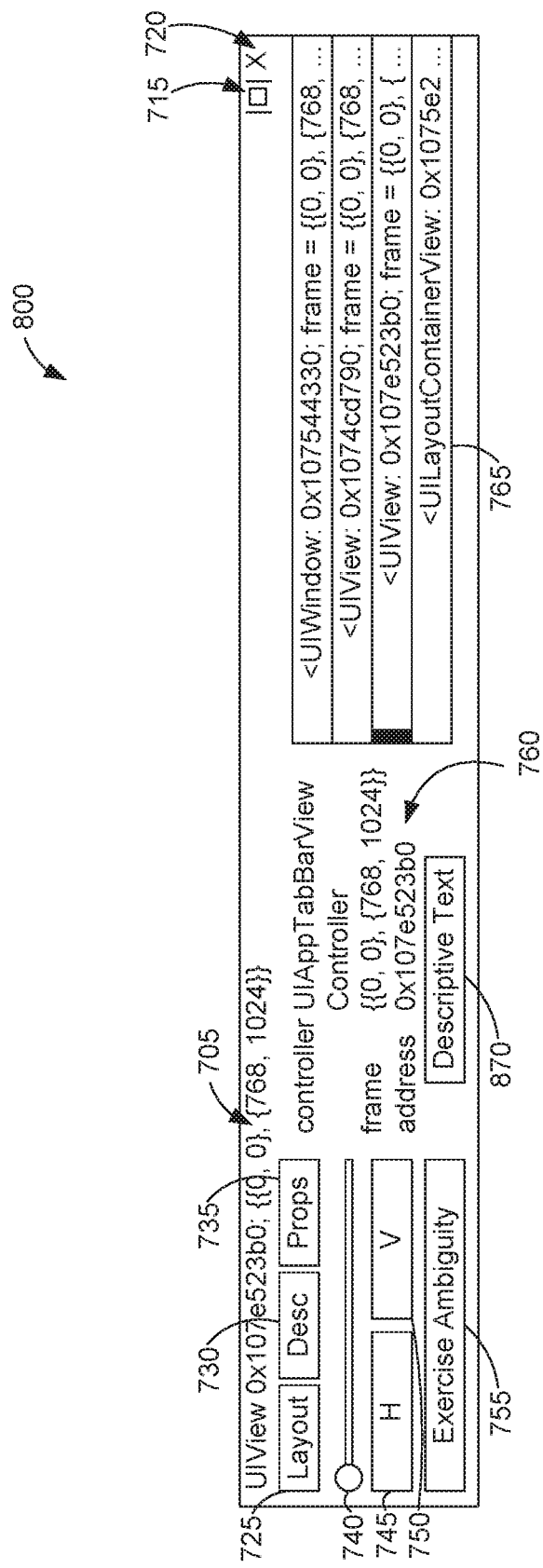
FIG. 8 is a block diagram illustrating a user interface suitable for presenting inspector data, according to some example embodiments.

FIG. 8 is a block diagram illustrating information region 800, suitable for presenting inspector data, according to some example embodiments. Information region 800 may be shown in place of information region 700 after a different user interface element is selected or in an alternative embodiment. As can be seen by comparison of FIGS. 7 and 8, the controller specific button 770 has been replaced with the text field 870. In this example, the text in the text field 870 corresponds to the text shown in the element 435 of FIG. 4. In an embodiment on a mobile device, by touching the text field 870, the user causes a touch-screen keyboard to be presented, into which the user can enter replacement text. In an embodiment on a laptop or desktop computer, the user clicks on the text field 870 to cause the text field 870 to gain the focus, and then types replacement text on a keyboard. Once the replacement text is received, the text in the element being viewed (e.g., the element 435) is updated. For example, the initial text in the text field 870 may be populated by calling a getText( ) function on the user interface object and the replacement text may be applied by calling a setText( ) function on the same object. In this way, a user or developer can see the impact of changing a text string on the user interface directly from a particular device running the application and without having to either run the application in a debug environment or rebuild the application. In another example embodiment, a slider is presented that is operable to increase or decrease the length of a selected string to see how the layout onscreen dynamically reacts to string length changes.

In some example embodiments, the controller specific button 770 is presented together with the text field 870 or other input elements (e.g., checkboxes, radio buttons, sliders, drop-down menus and the like). In this way, the user can enter values to be used as parameters for the method called when the user presses the controller specific button 770.

In some example embodiments, a table of switches is included that allows the user to turn on/off specific outline colors. For example, if the inspector is configured to display cyan, red, and orange for elements that are styled, have invalid layout, and have accessibility enabled respectively, the user may wish to turn off cyan and orange highlighting and leave only the invalid layout (red) items highlighted. Text information may be located below the table of switches that includes a description of the views associated with each color.

Figure 9:
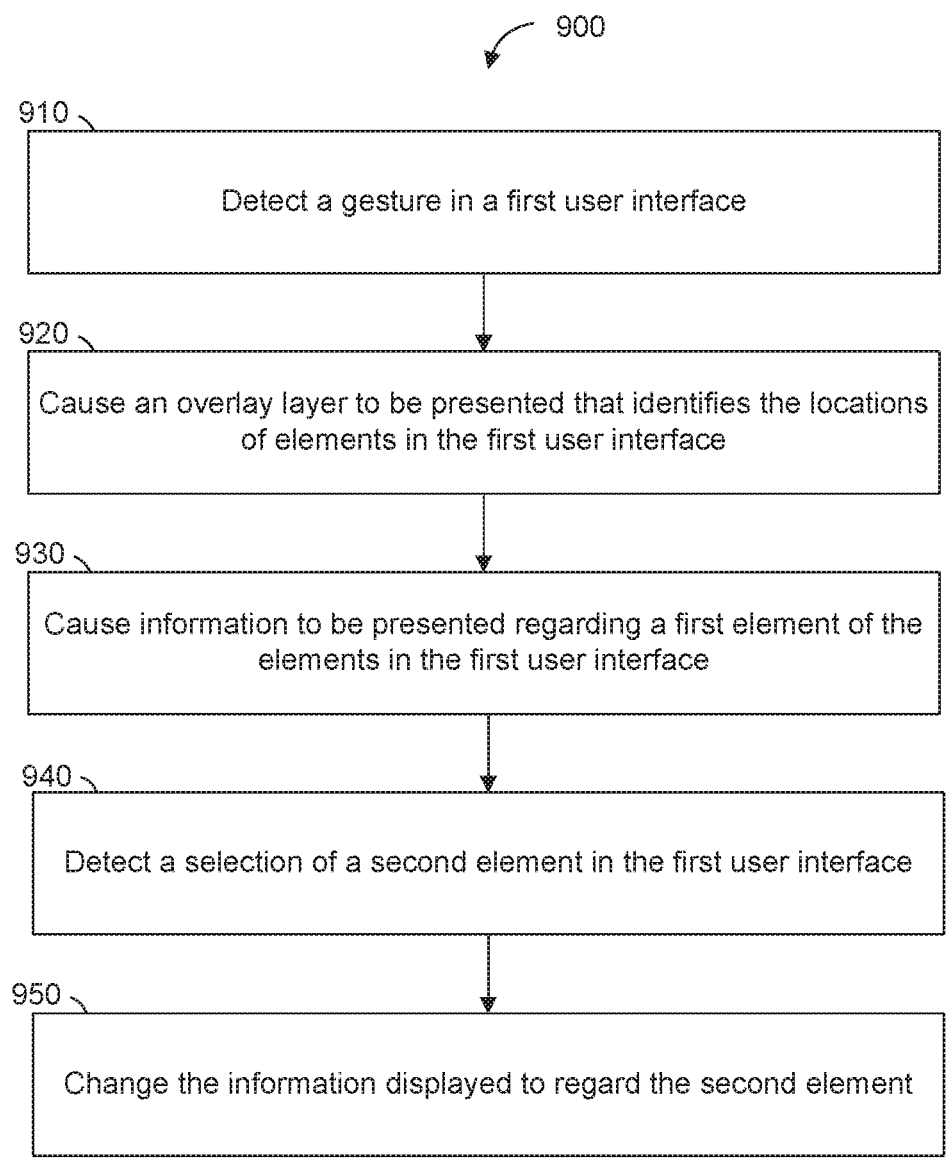
FIG. 9 is a flowchart illustrating operations of a device in performing a process of presenting inspector data, according to some example embodiments.

FIG. 9 is a flowchart illustrating operations of a device in performing a process 900 of presenting inspector data, according to some example embodiments. The process 900 includes operations 910-950. By way of example and not limitation, the operations of the process 900 are described as being performed by the system of FIG. 1 and the modules of FIG. 2.

In operation 910, the inspector components 220 detect a gesture in the user interface of an application (e.g., an application provided by the application components 210). In various example embodiments, the gesture is a two-finger touch, a force-press, or a swipe. In some example embodiments, an input other than a gesture is used, such as a keyboard input, a mouse click, or a mouse hover.

Prior to the operation 910, in some example embodiments, the application loads the inspector during its own startup sequence. The inspector attaches itself to the application window and listens for the gesture of operation 910 that will trigger its activation.

Responsive to the detection of the gesture, the inspector components 220 cause an overlay layer to be presented (operation 920). The overlay layer indicates the locations of one or more elements of the user interface of the application. For example, each element of the user interface may have an associated frame or bounding box. Corresponding boxes may be drawn on the overlay layer, having the effect of rendering the bounding box of each element visible, as shown in the elements 405-450 of the example screen of FIG. 4. In some example embodiments, only a particular subset of the elements have their locations presented. For example, certain classes or instances may be coded to be visible in the inspector while other classes or instances are coded to be invisible. In this way, classes or instances that are being debugged can be accessed with a gesture without distracting the user with information about classes or instances that are considered to be operating properly.

In operation 930, the inspector components 220 cause additional information to be presented regarding one of the elements of the user interface of the application. For example, the information bar 465 of FIG. 4 or the information region 555 of FIGS. 5-6 may be shown. In some example embodiments, the information gathered by the inspector components 220 from the core application components 210 is through traversal of a view hierarchy for the core application. For example, iOS applications have a main UIWindow object. Accessing the subviews property of that object identifies its child objects, which then can be accessed, including information about their children, and so on. Similarly, web applications use the domain object model ("DOM") which can be traversed to identify all elements of an HTML-based user interface. Regardless of the specific implementation, each object contains information used to present the corresponding user interface element, though the specific data available may vary from implementation to implementation.

In operation 940, the inspector components 220 detect a selection of a second element in the first user interface. In some example embodiments, the selection is performed by touching or clicking on the element in the user interface of the core application. Alternatively or additionally, the selection may be performed by interaction with the information presented by the inspector components 220. For example, a user may select an entry in the hierarchy information 765 of FIG. 7.

In response to the selection of the second element, the inspector components 220 update the additional information to reflect the second element (operation 950). For example, the information region 555 of FIG. 6 may be replaced by the information region 700 of FIG. 7.

Figure 10:
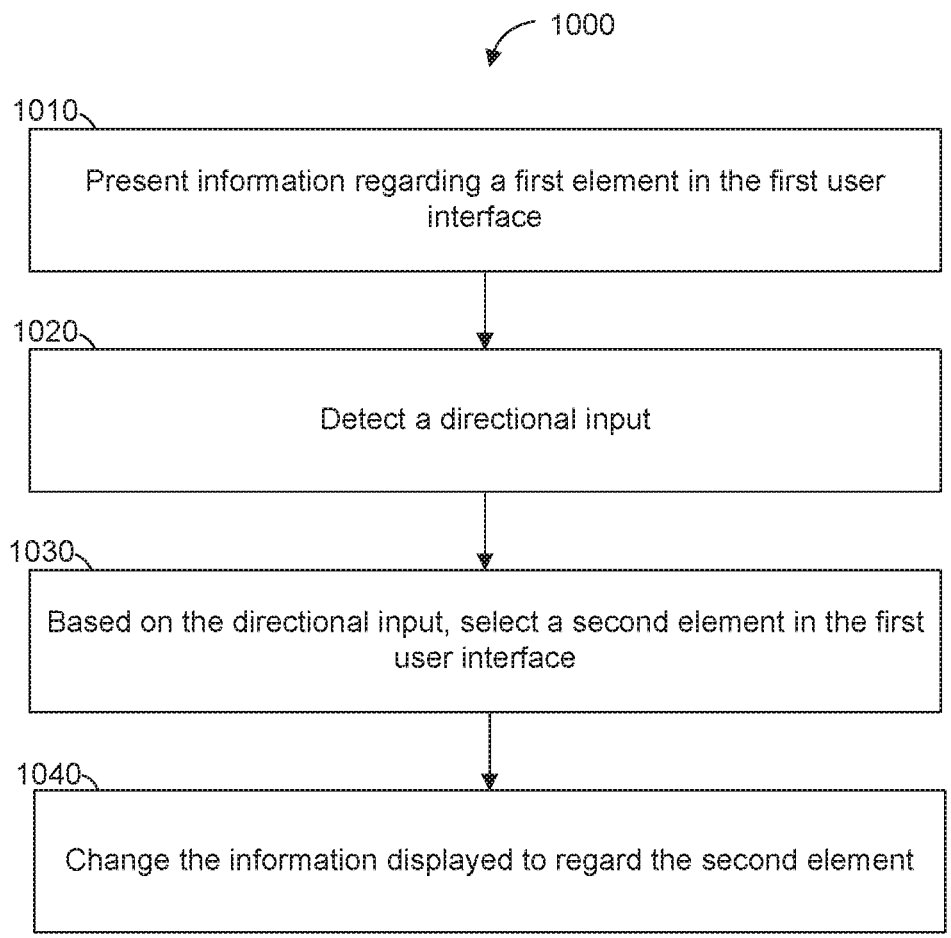
FIG. 10 is a flowchart illustrating operations of a device in performing a process of presenting inspector data, according to some example embodiments.

FIG. 10 is a flowchart illustrating operations of a device in performing a process 1000 of presenting inspector data, according to some example embodiments. The process 1000 includes operations 1010-1040. By way of example and not limitation, the operations of the process 1000 are described as being performed by the system of FIG. 1 and the modules of FIG. 2.

In operation 1010, the inspector components 220 cause information about a user element in a user interface to be presented. In some example embodiments, the information presented in operation 1010 is the same as the information presented in operation 930.

The inspector components 220 detect a directional input in operation 1020. For example, the input may be a gesture on a touch screen (e.g., a swipe up, down, left, or right). As another example, the directional input may be a tap, click, or hover on a top, bottom, left, or right edge of a display. As still another example, directional key presses such as arrow keys or presses of other assigned keys representing directions may be detected.

In operation 1030, the inspector components 220 select, based on the detected directional input, another element of the user interface. In some example embodiments, an up input causes selection of a parent element of the user element for which information is currently being displayed, a down input causes selection of a child element of the currently-displayed element, a right input causes selection of a next sibling element of the currently-displayed element, and a left input causes selection of a previous sibling element of the currently-displayed element.

Responsive to the change in the selected user element, the information displayed is updated to reflect the newly-selected element (operation 1040). For example, transition from the information region 555 to the information region 700 may be effected by two vertical swipes down.

Figure 11:
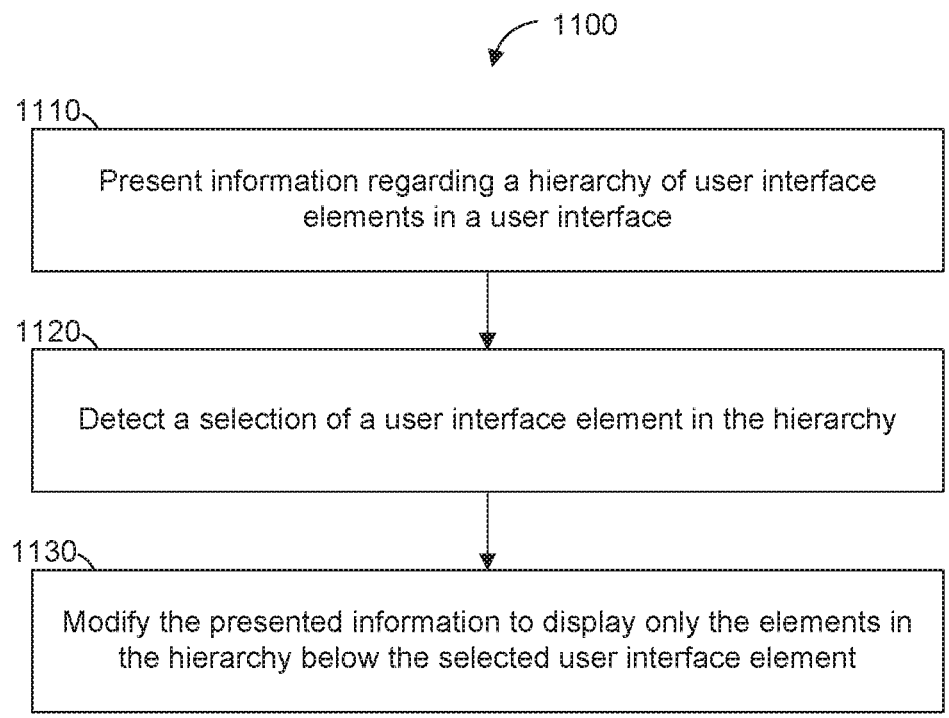
FIG. 11 is a flowchart illustrating operations of a device in performing a process of presenting inspector data, according to some example embodiments.

FIG. 11 is a flowchart illustrating operations of a device in performing a process 1100 of presenting inspector data, according to some example embodiments. The process 1100 includes operations 1110-1130. By way of example and not limitation, the operations of the process 1100 are described as being performed by the system of FIG. 1 and the modules of FIG. 2.

In operation 1110, the inspector components 220 present information regarding a hierarchy of user interface elements in a user interface. For example, the hierarchy information 665 of FIG. 6 or 765 of FIG. 7 may be presented.

In operation 1120, a selection of a user interface element in the hierarchy is detected by the inspector components 220. For example, the user, viewing the hierarchy information 665 of FIG. 6, may touch the third element of the hierarchy.

In operation 1130, the inspector components 220 modify the presented information to display only the elements in the hierarchy below the selected user interface element. This modification may be in response to the selection detected in operation 1120 or in response to activation of another user interface element. For example, the focus-lock button 715 may be used to cause the selected element to be presented as the root element of the displayed hierarchy. In some example embodiments, pressing the focus-lock button 715 while the root node is the currently-selected node causes the hierarchy display to return to its original form.

One or more of the methodologies described herein may obviate a need for certain efforts or resources that otherwise would be involved in debugging an application or otherwise exploring the construction of a user interface. Efforts expended by a developer in identifying problems in an application or in identifying particular user interface elements for improvement may also be reduced by one or more of the methodologies described herein. For example, directly identifying a particular instance of an object from within the user interface may facilitate identifying the corresponding portion of source code, saving time for the developer, and indirectly saving processor use and power consumption by avoiding time-consuming development exercises. Computing resources used by one or more machines, databases, or devices (e.g., within a network environment) may similarly be reduced. Examples of such computing resources include processor cycles, network traffic, memory usage, data storage capacity, power consumption, and cooling capacity.

Example Machine Architecture and
Machine-Readable Medium

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

As a practical matter, certain embodiments of the machine 1200 may be more suitable to the methodologies described herein. For example, while any computing device with sufficient processing power may serve as the machine on which the application runs, accelerometers, cameras, and cellular network connectivity are not directly related to the ability of the machine to perform the application inspector processes discussed herein. Accordingly, in some example embodiments, cost savings are realized by implementing the various described methodologies on machines 1200 that exclude additional features unnecessary to the performance of the tasks assigned to each machine.

The machine 1200 may include processors 1210, memory 1230, and I/O components 1250, which may be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processors that may comprise two or more independent processors (also referred to as "cores") that may execute instructions contemporaneously. Although FIG. 12 shows multiple processors 1210, the machine 1200 may include a single processor with a single core, a single processor with multiple cores (e.g., a multi-core process), multiple processors with a single core, multiple processors with multiples cores, or any combination thereof.

The memory 1230 may include a main memory 1232, a static memory 1234, and a storage unit 1236 accessible to the processors 1210 via the bus 1202. The storage unit 1236 may include a machine-readable medium 1238 on which is stored the instructions 1216 embodying any one or more of the methodologies or functions described herein. The instructions 1216 may also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various implementations, the main memory 1232, static memory 1234, and the processors 1210 are considered as machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e g, hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, in some implementations, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1264, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory having stored processor-executable instructions; and
a processor configured to execute the processor-executable instructions to implement an inspector tool to perform operations comprising:
communicating with an executing application to identify an element in a user interface of the executing application, the user interface comprising multiple elements organized in a hierarchy;
superimposing a transparent layer over the user interface, the transparent layer including one or more graphical objects that indicate locations of one or more corresponding elements of the user interface; and
presenting an expandable information bar configured to permit visual manipulation of the transparent layer, the expandable information bar being further configured to be expanded to provide an information region contained within the expandable information bar, the information region providing information on the hierarchy of multiple elements and enabling interaction with the transparent layer, the presenting facilitating access to debugging functionality to debug a layout of the user interface.

2. The system of claim 1, wherein the expandable information bar is configured to provide information comprising class names of the multiple elements, memory locations of the multiple elements, (x,y) positions of the multiple elements, and (width, height) of the multiple elements.

3. The system of claim 1, wherein the inspector tool performs operations further comprising using color coding to represent particular classes of the multiple elements.

4. The system of claim 1, wherein the inspector tool performs operations further comprising requesting the executing application to determine a particular color for at least some of the multiple elements.

5. The system of claim 1, wherein the information region includes a highlight button to cause a currently-selected element to be treated as a top-level element for a view hierarchy.

6. The system of claim 1, wherein the information region includes an opacity slider to change the opacity of the transparent layer showing boundaries of elements of the multiple elements.

7. The system of claim 1, wherein the information region includes a plurality of buttons that are operable to perform actions for debugging the layout of the user interface, the plurality of buttons including:
a horizontal button operable to enable horizontal constraints relevant to a view in focus to be sent to a console;
a vertical button operable to enable vertical constraints relevant to a view in focus to be sent to the console;
a button to enable a message to be sent to the executing application to re-layout the view to enable visual identification of changes to the view; and
a focus-lock button to cause hierarchy information to be modified to a currently-selected element as a root of the hierarchy.

8. A method for debugging a layout of a user interface, the method comprising:
using an inspector tool to communicate with an executing application to identify an element in a user interface of the executing application, the user interface comprising multiple elements organized in a hierarchy;
superimposing a transparent layer over the user interface, the transparent layer including one or more graphical objects that indicate locations of one or more corresponding elements of the user interface; and
presenting an expandable information bar configured to permit visual manipulation of the transparent layer, the expandable information bar being further configured to be expanded to provide an information region contained within the expandable information bar, the information region providing information on the hierarchy of multiple elements and enabling interaction with the transparent layer, the presenting facilitating access to debugging functionality to debug a layout of the user interface.

9. The method of claim 8, wherein the expandable information bar is configured to provide information comprising class names of the multiple elements, memory locations of the multiple elements, (x,y) positions of the multiple elements, and (width, height) of the multiple elements.

10. The method of claim 8, wherein the information region includes a highlight button to cause a currently-selected element to be treated as a top-level element for a view hierarchy.

11. The method of claim 8, wherein the information region includes an opacity slider to change the opacity of the transparent layer showing boundaries of elements of the multiple elements.

12. The method of claim 8, wherein the information region includes a plurality of buttons that are operable to perform actions for debugging the layout of the user interface, the plurality of buttons including:
  a horizontal button operable to enable horizontal constraints relevant to a view in focus to be sent to a console;
  a vertical button operable to enable vertical constraints relevant to a view in focus to be sent to the console;
  a button to enable a message to be sent to the executing application to re-layout the view to enable visual identification of changes to the view; and
  a focus-lock button to cause hierarchy information to be modified to a currently-selected element as a root of the hierarchy.

13. A non-transitory machine-readable medium storing instructions to implement an inspector tool which, when executed by one or more processors of a machine, cause the machine to perform operations comprising:
  communicating with an executing application to identify an element in a user interface of the executing application, the user interface comprising multiple elements organized in a hierarchy;
  superimposing a transparent layer over the user interface, the transparent layer including one or more graphical objects that indicate locations of one or more corresponding elements of the user interface; and
  presenting an expandable information bar configured to permit visual manipulation of the transparent layer, the expandable information bar being further configured to be expanded to provide an information region contained within the expandable information bar, the information region providing information on the hierarchy of multiple elements and enabling interaction with the transparent layer, the presenting facilitating access to debugging functionality to debug a layout of the user interface.

14. The non-transitory machine-readable medium of claim 13, wherein the expandable information bar is configured to provide information comprising class names of the multiple elements, memory locations of the multiple elements, (x,y) positions of the multiple elements, and (width, height) of the multiple elements.

15. The non-transitory machine-readable medium of claim 13, wherein the operations further comprise using color coding to represent particular classes of the multiple elements.

16. The non-transitory machine-readable medium of claim 13, wherein the operations further comprise requesting the executing application to determine a particular color for at least some of the multiple elements.

17. The non-transitory machine-readable medium of claim 13, wherein the information region includes an opacity slider to change the opacity of the transparent layer showing boundaries of elements of the multiple elements.

18. The non-transitory machine-readable medium of claim 13, wherein the information region includes a plurality of buttons that are operable to perform actions for debugging the layout of the user interface, the plurality of buttons including:
  a horizontal button operable to enable horizontal constraints relevant to a view in focus to be sent to a console;
  a vertical button operable to enable vertical constraints relevant to a view in focus to be sent to the console;
  a button to enable a message to be sent to the executing application to re-layout the view to enable visual identification of changes to the view; and
  a focus-lock button to cause hierarchy information to be modified to a currently-selected element as a root of the hierarchy.

19. The system of claim 1, wherein the debugging functionality further comprises visually coding the one or more graphical objects to indicate rule compliance.

20. The system of claim 1, wherein the visual manipulation of the transparent layer includes changing the degree of occlusion of overlapping elements of the multiple elements of the transparent layer.

* * * * *